W. R. SPICKLER.
GATE.
APPLICATION FILED JUNE 7, 1919.

1,332,770.

Patented Mar. 2, 1920.
2 SHEETS—SHEET 1.

Witnesses
Geo. E. Logan

Inventor
W. R. Spickler
By Victor J. Evans
Attorney.

W. R. SPICKLER.
GATE.
APPLICATION FILED JUNE 7, 1919.

1,332,770.

Patented Mar. 2, 1920.
2 SHEETS—SHEET 2.

Witnesses
Geo. E. Logan

Inventor
W. R. Spickler
By Victor J. Evans
Attorney

UNITED STATES PATENT OFFICE.

WILLIAM R. SPICKLER, OF SHELDON, ILLINOIS.

GATE.

1,332,770.	Specification of Letters Patent.	Patented Mar. 2, 1920.

Application filed June 7, 1919. Serial No. 302,483.

*To all whom it may concern:*

Be it known that I, WILLIAM R. SPICKLER, a citizen of the United States, residing at Sheldon, in the county of Iroquois and State of Illinois, have invented new and useful Improvements in Gates, of which the following is a specification.

This invention has reference to improvements in farm gates, and particularly to the means for hanging such gates to a supporting post.

The primary object of the invention is to provide means whereby a gate may be readily elevated and sustained a desired distance above the ground surface to permit of the passage of small animals and fowls from one field to another field divided by the fence to which the gate is attached.

Other objects and advantages will appear as the nature of the invention is better understood, reference being had to the accompanying drawings, in which.

Figure 1:
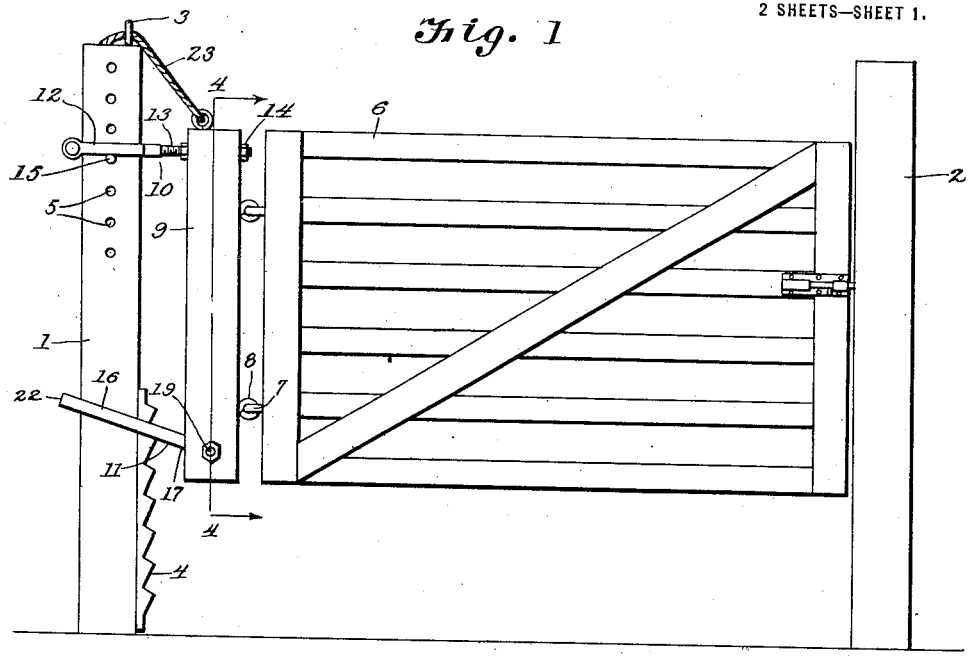
Figure 1 is a side elevation of the improvement.
Figure 2:
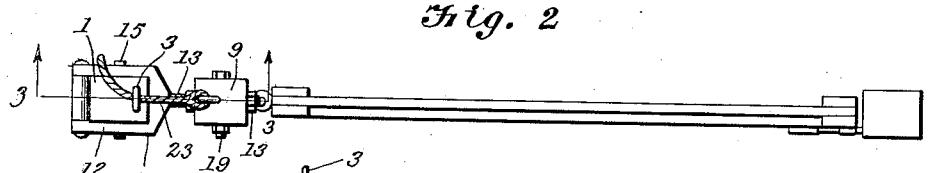
Fig. 2 is a top plan view thereof.
Figure 3:
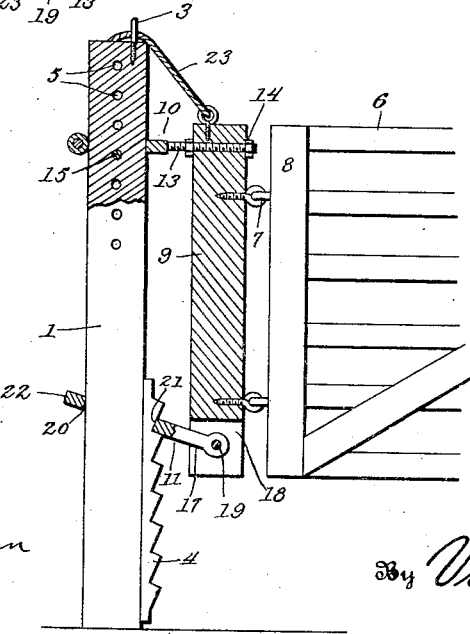
Fig. 3 is a sectional view approximately on the line 3—3 of Fig. 1.
Figure 4:
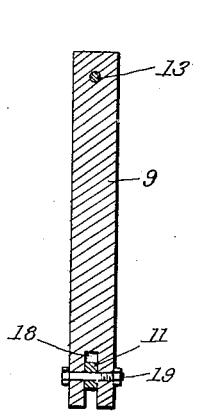
Fig. 4 is a sectional view approximately on the line 4—4 of Fig. 1.
Figure 6:
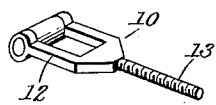
Fig. 6 is a perspective view of the upper hanger member.
Figure 5:
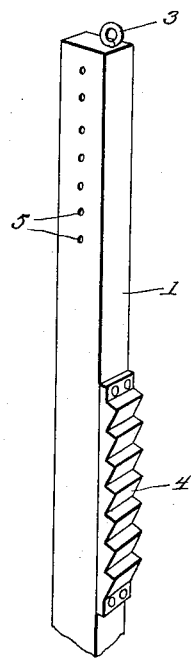
Fig. 5 is a perspective view of the hanger post.
Figure 7:
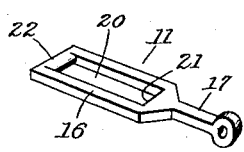
Fig. 7 is a perspective view of the lower hanger member.

In the drawings the numeral 1 designates the hanger post for the gate and 2 the abutment post. The hanger post has preferably arranged upon its upper end an eye member 3 to which may be attached the upper line wire of the fence secured to the post, and which also provides an additional purpose which will hereinafter be apparent.

The post 1, upon its inner face has secured thereon a rack bar 4 and the said post, above the rack bar may be provided with a plurality of alining spaced transverse apertures 5.

The gate is indicated by the numeral 6 and may be constructed of either wood, metal, wire mesh or, in fact, of any desired material, the same being suitably braced and having its inner end provided with a pair of spaced eyes 7 which are engaged by similar eyes 8 on a vertically arranged bar 9. The hanger members for the gate are connected to the bar 9, the upper hanger member being indicated by the numeral 10 and the lower by the numeral 11. The member 10 includes a slotted body 12 having a threaded extension in the nature of a stem 13, and this stem is screwed through the upper end of the bar 9, having arranged thereon nuts 14 which contact with both the inner and outer faces of the said bar whereby to hold the hanger member adjusted and rigid with respect to the bar 9. The slot of the hanger is of a size to snugly receive therethrough the post 1, and a suitable stop member, such as a pin 15 is inserted through one of the apertures 5 in the said post 1 and is contacted by the under face of the body of the hanger 10.

The lower hanger also includes a flat slotted body 16 having at one of its ends a projecting stem 17. This stem is received in a slot 18 in the lower end of the bar 9 and is pivoted to the said bar as indicated by the numeral 19. The slot or opening 20 in the body 16 is of a length equaling the thickness of the post 1 and the rack bar 4 which is secured on the post, so that when the body 16 is tilted to an angle with respect to the post the inner end wall 21 provided by the slot 20 will be received between two of the teeth of the rack bar 4, the outer wall 22 provided by the slot 20 contacting with the outer face of the post 1, thus effectively sustaining the hanger at a desired angle and consequently permitting the gate to be arranged at any desired distance on the post 1 above the ground surface. It is, of course, to be understood that in elevating the gate the pin 15 is withdrawn from one of the apertures 5 and placed in another aperture.

The gate and hangers may be raised by hand on the post 1 if desired, but as the post 1 is preferably of a comparatively great height, I may, if desirable, secure to the bar 9 a cable 23 that passes over the top of the post 1 through the eye 3, and by pulling the cable thus elevate the gate.

It is believed, from the foregoing description, when taken in connection with the drawings, the simplicity and advantages of the construction will be readily apparent without further detailed description.

Having thus described the invention, what is claimed as new, is:—

1. A gate, a bar hinged thereto, a post, a rack bar on said post, hangers slidable on said post, one of said hangers engaging said rack bar, a pivotal connection between this hanger and the bar, adjustable means for supporting the second hanger on the post, and a rigid connection between said second hanger and said bar.

2. A gate, a bar hinged thereto, a post, hangers adjustable on said post and having means for sustaining the same thereto, a pivotal connection between the lower hanger and the bar, a rigid connection between the upper hanger and the bar, and a flexible element connected to the bar and guided over the post, as and for the purpose set forth.

In testimony whereof I affix my signature.

WILLIAM R. SPICKLER.